(12) United States Patent
Scattergood

(10) Patent No.: US 10,515,298 B2
(45) Date of Patent: Dec. 24, 2019

(54) RFID TRANSPONDER IN A PLASTIC PACKAGE FOR CONTACTLESS COMMUNICATION

(71) Applicant: SES RFID Solutions GmbH, Düsseldorf (DE)

(72) Inventor: Martin Scattergood, Düsseldorf (DE)

(73) Assignee: SES RFID Solutions GmbH, Dusseldorf (DE)

( * ) Notice: Subject to any disclaimer, the term of this patent is extended or adjusted under 35 U.S.C. 154(b) by 0 days.

(21) Appl. No.: 16/026,894

(22) Filed: Jul. 3, 2018

(65) Prior Publication Data

US 2019/0012587 A1    Jan. 10, 2019

(30) Foreign Application Priority Data

Jul. 7, 2017   (DE) .................... 10 2017 006 450

(51) Int. Cl.
  *G06K 19/07*    (2006.01)
  *G06K 19/077*   (2006.01)
  *H04B 5/00*     (2006.01)

(52) U.S. Cl.
  CPC ... *G06K 19/0723* (2013.01); *G06K 19/07781* (2013.01); *G06K 19/07794* (2013.01); *H04B 5/0081* (2013.01)

(58) Field of Classification Search
  CPC .................................................. G06K 19/0723
  USPC ....................................................... 235/492
  See application file for complete search history.

(56) References Cited

U.S. PATENT DOCUMENTS

| | | | |
|---|---|---|---|
| 9,646,242 B2* | 5/2017 | Hofer | G06K 19/07794 |
| 2010/0321161 A1 | 12/2010 | Isabell | |
| 2013/0075477 A1 | 3/2013 | Finn et al. | |
| 2017/0011287 A1 | 1/2017 | Kapp | |
| 2018/0174015 A1* | 6/2018 | Destraves | H04B 1/24 |
| 2018/0219334 A1* | 8/2018 | Kahlman | A61B 5/0015 |

FOREIGN PATENT DOCUMENTS

| | | |
|---|---|---|
| DE | 10 2006 051 379 A1 | 4/2008 |
| WO | 2009/080607 A2 | 7/2009 |

OTHER PUBLICATIONS

Office Action dated Jun. 21, 2018 for German Patent Application No. 10 2017 006 450.4, 4 pages.
European Search Report dated Dec. 10, 2018 in Patent Application No. 18000497.0, all pages.

* cited by examiner

*Primary Examiner* — Toan C Ly
(74) *Attorney, Agent, or Firm* — Kilpatrick Townsend & Stockton LLP

(57) ABSTRACT

A RFID transponder including a chip, having an antenna to which the chip is connected for contactless communication, and including a plastic package (1) which accommodates these transponder components as integrated components, wherein the plastic package (1) forms a coil core (2) on its outer surface, on which a booster antenna having at least one coil winding (4) is arranged, wherein the coil winding (4) completely surrounds the integrated antenna in order to form an inductive coupling, and the two ends (5, 6) of the coil winding (4) form antenna wires of a dipole antenna for the UHF range.

8 Claims, 1 Drawing Sheet

RFID TRANSPONDER IN A PLASTIC PACKAGE FOR CONTACTLESS COMMUNICATION

CROSS-REFERENCE TO RELATED APPLICATIONS

This application claims priority to German Patent Application No. 10 2017 006 450.4, filed Jul. 7, 2017, the disclosure of which is incorporated by reference herein in its entirety.

The present invention relates to a contactlessly activated RFID transponder in a plastic package which accommodates the transponder components, according to the preamble of claim 1.

If the transponder is subjected to high mechanical stress, a plastic package (PP) is often used to protect the transponder components. Such a type of transponder may be integrated into other objects, components, labels, sales packages, textiles, etc., and enables the accommodation of larger chips and longer coils. The functional range is thereby increased.

As described in WO 2009/080607 A2, two frequencies are used in RFID technology, the HF frequency (13.56 MHz) and the UHF frequency (860 to 960 MHz). The coupling mechanisms differ for the two frequency ranges. HF systems work with inductive coupling systems and require a coil antenna for the coupling. On the other hand, the UHF systems work using electromagnetic waves and generally require a dipole antenna. A UHF transponder may be used in the near range, wherein the coupling is achieved via electric and/or magnetic and/or electromagnetic fields, as well as in the far range, wherein the coupling takes place via electromagnetic waves. In addition, it is known to couple an RFID transponder into a larger booster antenna which is used for amplifying the transmission and read performance of the RFID transponder. To this end, a small mini-tag on a paper or polymer substrate is used, which is made up of an antenna and a chip mounted on the antenna contacts. The mini-tag and the booster antenna are not in contact via an electrical conductor, but rather are coupled exclusively via electric, magnetic, or electromagnetic fields. Such a booster antenna may be printed onto a printed package simultaneously with the printed content. The positioning accuracy here is significantly less than in the case of direct contact. The printing process ensures that the positioning accuracy is sufficient.

In order to improve the performance of the contactless communication, DE 10 2006 051 379 A1 also discloses the inductive coupling of a booster antenna to an RFID chip module. For this purpose, these components are applied and fixed to a woven textile substrate.

It is thus advantageous that the electrical connection between the RFID chip module antenna and the booster antenna is eliminated; however, it must be ensured that an inductive coupling region is formed between the booster antenna and the RFID chip module antenna. For this purpose, sufficient positioning accuracy must be maintained, which requires fixing the booster antenna correctly with respect to the chip module.

The object of the present invention is to provide an RFID transponder which can be exposed to high mechanical stress and which has improved performance due to the connection of a booster antenna.

This object is achieved via the features of Claim 1.

An RFID transponder is hereby provided, in which the transponder components are integrated into a plastic package for their protection. The plastic package furthermore forms a coil core on which the booster antenna having at least one coil winding is arranged. The coil winding provides a coupling region between the booster antenna and the chip antenna, and thus ensures mechanically fixed positioning accuracy for an optimal coupling of the booster antenna to the chip antenna. The plastic package thus assumes additional functionality as a fixing and alignment aid for a spatial alignment of the inductive coupling region between the booster antenna and the chip antenna.

Automated fabrication of RFID transponders for the UHF range is thereby significantly simplified, particularly as the fabrication may be carried out on a strand of antenna wire with spaced wrapping of RFID transponders. By cutting to length, the individual modules of RFID transponders having an attached booster antenna may be produced.

Additional embodiments and advantages of the present invention may be found in the following description and the subclaims.

The present invention will be described in greater detail based on the exemplary embodiment depicted in the attached images.

Figure 1:
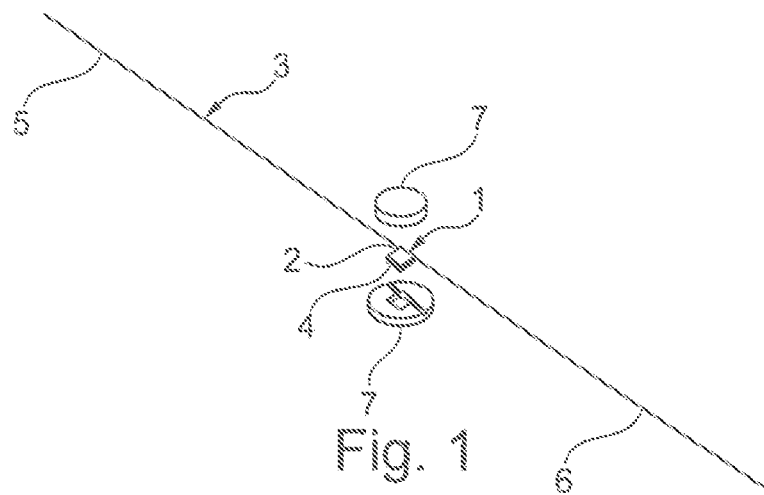
FIG. 1 is a schematic diagram of an RFID transponder according to the invention.

FIG. 1 schematically depicts a perspective view of an RFID transponder having a booster antenna, before the attachment of a preferably provided main housing.

Figure 2:
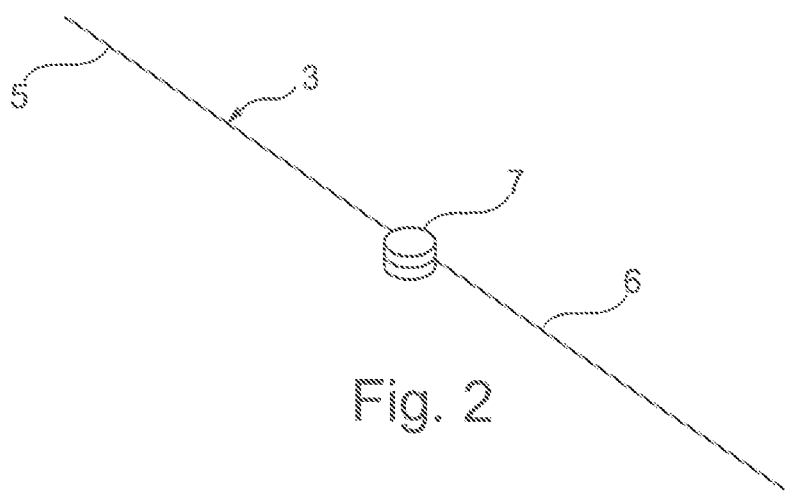
FIG. 2 illustrates a cylinder-shaped main housing according to the invention.

FIG. 2 schematically depicts a perspective view of the RFID transponder according to FIG. 1, having a fixed main housing.

Figure 3:
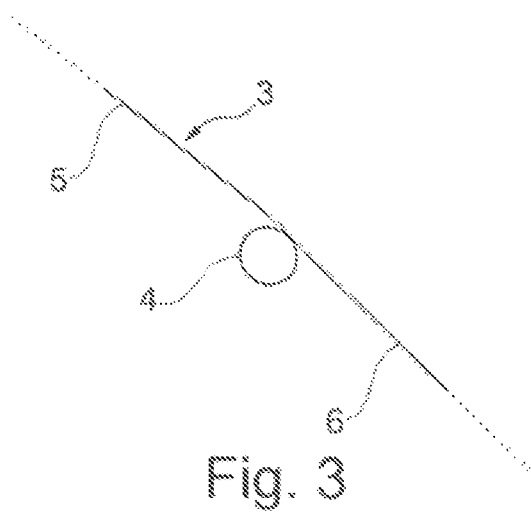
FIG. 3 illustrates antenna wires of a dipole antenna according to the invention.

FIG. 3 schematically depicts wire guides with the coil winding of the booster antenna.

FIG. 1 shows an RFID transponder, in which the transponder components are integrated into a plastic package 1. Here, the RFID transponder comprises, in a known manner, a chip (not depicted) and an antenna (not depicted) which is connected to the chip for contactless communication. The plastic package 1 accommodates these transponder components as integrated components. The plastic package 1 (PP) forms a so-called PP transponder, which is able to accommodate larger microchips and longer coils for increased functional ranges. The material for the plastic package 1 may be selected based on the application. The plastic material should also include composites made up of curable resins.

The plastic package 1 furthermore forms a coil core 2 on its outer surface. A booster antenna 3 having at least one coil winding 4 is arranged on the coil core 2, wherein the coil winding 4 completely surrounds the integrated antenna of the chip in order to form an inductive coupling. The two ends 5, 6 of the coil winding 4 form antenna wires of a dipole antenna for the UHF range as shown in FIG. 3.

The plastic package 1 and the at least one coil winding 4 are preferably integrated into a main housing 7, which is made up here, for example, of two halves which can be assembled. The main housing 7 is, for example, cylinder-shaped as seen in FIG. 2.

The antenna (not depicted) which is connected to the chip and integrated into the plastic package 1, and the at least one coil winding 4 of the booster antenna 3, preferably form conductor loops which are aligned with respect to one other. Preferably, the coil core 2 is arranged concentrically with respect to the antenna which is connected to the chip and which is preferably configured as a winding coil. The chip is then also preferably arranged in the centre of this winding coil.

The coil core 2 may have a round or angular cross section. To form the coil core 2, a groove, recess, or some other path which is formed or mounted around the outer surface of the plastic package 1 may be provided. However, even a peripheral surface of the plastic package 1 is sufficient as a positioning surface for the at least one coil winding 4.

By means of the preferably provided main housing 7, the plastic package 1 and the at least one coil winding 4 may be fixed with respect to one another, for example, using adhesive, welding, etc.

The transponder components comprise, in a known manner, a microchip which is connected to the ends of a chip antenna for contactless communication. Together, these transponder components are integrated into the plastic package 1 for configuring the PP RFID transponder. Therefore, the chip antenna has a specified orientation with respect to the spatial structure of the plastic package 1, opposite which the coil winding 4 assumes a specified position due to the use of the plastic package 1 as a positioning surface. Preferably, the chip antenna is a flat coil having a winding plane that can be taken for aligning the booster antenna 3 in order to form an optimal coupling between the chip antenna and the booster antenna 3.

The antenna wire which is used for forming the booster antenna 3 can be extended in automated production to have several devices in a chain.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. RFID transponder including a chip, having a chip antenna being a flat coil to which the chip is connected for contactless communication, and having a plastic package which accommodates the chip and the chip antenna as integrated components, wherein the plastic package forms a coil core on its outer surface concentric to the chip antenna, on which a booster antenna having at least one coil winding is arranged, wherein the coil winding completely surrounds the chip antenna in order to form an inductive coupling, and the two ends of the coil winding form antenna wires of a dipole antenna for the UHF range; wherein the plastic package defines a mechanically fixed coupling region between the coil winding of the booster antenna and the chip antenna such that the coupling region ensures a mechanically fixed position of the booster antenna relative to the chip antenna, whereby the plastic package comprises a fixing and alignment aid for spatial alignment of the coupling region between the booster antenna and the chip antenna.

2. RFID transponder according to claim 1, wherein the plastic package and the at least one coil winding are integrated into a main housing.

3. RFID transponder according to claim 2, wherein the main housing is cylinder-shaped.

4. RFID transponder according to claim 1, wherein the chip antenna and the at least one coil winding of the booster antenna, form conductor loops which are aligned with respect to each other.

5. RFID transponder according to claim 1, wherein the coil core is arranged concentrically with respect to the chip antenna which is formed as a winding coil.

6. RFID transponder according to claim 5, wherein the chip is arranged in the centre of the winding coil.

7. RFID transponder according to claim 1, wherein the coil core has a round or angular cross section.

8. RFID transponder according to claim 1, wherein the chip antenna has an orientation with respect to a spatial structure of the plastic package that defines a positioning surface.

* * * * *